United States Patent
Hatanaka et al.

(10) Patent No.: US 9,255,191 B2
(45) Date of Patent: Feb. 9, 2016

(54) CURED-FILM FORMATION COMPOSITION, ORIENTATION MATERIAL, AND RETARDATION MATERIAL

(71) Applicant: NISSAN CHEMICAL INDUSTRIES, LTD., Tokyo (JP)

(72) Inventors: Tadashi Hatanaka, Funabashi (JP); Tomohisa Ishida, Funabashi (JP); Shojiro Yukawa, Funabashi (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/414,309

(22) PCT Filed: Jul. 11, 2013

(86) PCT No.: PCT/JP2013/069017
§ 371 (c)(1),
(2) Date: Jan. 12, 2015

(87) PCT Pub. No.: WO2014/010688
PCT Pub. Date: Jan. 16, 2014

(65) Prior Publication Data
US 2015/0191572 A1   Jul. 9, 2015

(30) Foreign Application Priority Data
Jul. 12, 2012   (JP) ................................ 2012-156843

(51) Int. Cl.
| | | |
|---|---|---|
| C08F 2/46 | (2006.01) | |
| C08G 61/04 | (2006.01) | |
| C08J 5/18 | (2006.01) | |
| C08L 33/24 | (2006.01) | |
| C08L 71/02 | (2006.01) | |
| C08L 101/02 | (2006.01) | |
| G02B 5/30 | (2006.01) | |
| G02F 1/1337 | (2006.01) | |
| G02F 1/13363 | (2006.01) | |

(52) U.S. Cl.
CPC .. *C08J 5/18* (2013.01); *C08L 33/24* (2013.01); *C08L 71/02* (2013.01); *C08L 101/02* (2013.01); *G02B 5/3016* (2013.01); *G02F 1/13363* (2013.01); *G02F 1/133711* (2013.01); *C08J 2333/10* (2013.01); *C08J 2333/12* (2013.01); *C08J 2333/26* (2013.01); *C08J 2401/28* (2013.01); *C08J 2433/26* (2013.01); *C08J 2467/02* (2013.01); *C08J 2467/04* (2013.01); *C08J 2469/00* (2013.01); *G02F 2001/133631* (2013.01)

(58) Field of Classification Search
USPC ............. 522/69, 68, 6, 1, 71, 189, 184; 520/1
See application file for complete search history.

(56) References Cited

U.S. PATENT DOCUMENTS

| 5,631,051 A | 5/1997 | Ito | |
|---|---|---|---|
| 2009/0226728 A1* | 9/2009 | Onoe et al. ..................... | 428/413 |
| 2013/0021565 A1* | 1/2013 | Hatanaka et al. ............. | 349/106 |

FOREIGN PATENT DOCUMENTS

| JP | H08-338913 A | 12/1996 |
|---|---|---|
| JP | 10-232365 A | 9/1998 |
| JP | 2001-517719 A | 10/2001 |
| JP | 3611342 B2 | 1/2005 |
| JP | 2005-49865 A | 2/2005 |
| JP | 2007-121721 A | 5/2007 |
| JP | 2009-058584 A | 3/2009 |
| JP | 2011-122012 A | 6/2011 |
| WO | 2011-126021 * | 10/2011 |
| WO | 2011/126021 A1 | 10/2011 |
| WO | 2011/126022 A1 | 10/2011 |
| WO | 2013/002224 A1 | 1/2013 |

OTHER PUBLICATIONS

Oct. 15, 2013 Written Opinion of the International Search Authority issued in International Patent Application No. PCT/JP2013/069017.
Oct. 15, 2013 Search Report issued in International Patent Application No. PCT/JP2013/069017.

* cited by examiner

*Primary Examiner* — Ling Choi
*Assistant Examiner* — Jessica E Whiteley
(74) *Attorney, Agent, or Firm* — Oliff PLC

(57) ABSTRACT

A cured-film formation composition for forming a cured film having photoreaction efficiency and solvent resistance, and high adhesiveness alignment uniformity, and an orientation material for photo-alignment, and a retardation material formed by use of the orientation material. A cured-film formation composition includes (A) a compound having a photo-aligning group and one substituent selected from a hydroxy group, a carboxy group, and an amino group; (B) a hydrophilic polymer having one or more substituents selected from a hydroxy group, a carboxy group, and an amino group; and (C) a polymer obtained by polymerizing a monomer including an N-hydroxymethyl compound or an N-alkoxymethyl (meth)acrylamide compound, and optionally further a cross-linking catalyst as a component (D). By use of the composition, a cured-film is formed and an orientation material is formed by utilizing photo-alignment technique. A retardation material is obtained by applying a polymerizable liquid crystal on the orientation material and curing it.

14 Claims, No Drawings

CURED-FILM FORMATION COMPOSITION, ORIENTATION MATERIAL, AND RETARDATION MATERIAL

TECHNICAL FIELD

The present invention relates to a cured-film formation composition, an orientation material, and a retardation material.

BACKGROUND ART

Recently, in the field of displays such as televisions including liquid crystal panels, as an approach to achieve higher performance, 3D displays with which 3D images can be enjoyed have been developed. In such 3D displays, a stereoscopic image can be displayed by, for example, making the right eye of a viewer see an image for the right eye and making the left eye of the viewer see an image for the left eye.

Various 3D display methods for displaying 3D images can be used, and examples of the methods known as methods requiring no special eyeglasses include a lenticular lens method and a parallax barrier method.

As one of display methods for viewers to see 3D images with eyeglasses, a circularly polarized glasses method, for example, is known (see Patent Document 1, for example).

In a 3D display using the circularly polarized glasses method, a retardation material is generally arranged on a display element for forming an image of a liquid crystal panel and the like. In this retardation material, two types of retardation regions having different retardation characteristics are regularly arranged each in plurality to constitute a retardation material that is patterned. In the present specification, a retardation material thus patterned in which a plurality of retardation regions having different retardation characteristics is arranged is called a patterned retardation material hereinafter.

The patterned retardation material can be fabricated by optically patterning a retardation substance including a polymerizable liquid crystal as disclosed in Patent Document 2, for example. In the optical patterning of the retardation substance including a polymerizable liquid crystal, a photo-alignment technique known for forming an orientation material for a liquid crystal panel is used. More specifically, a coating made of a material having photo-alignment properties is provided on a substrate, and two types of polarized beams having different polarization directions are radiated on this coating. Thus, a photo-alignment film is obtained as an orientation material in which two types of liquid crystal alignment regions are formed and the directions of alignment control of liquid crystals in the regions are different. Onto this photo-alignment film, a retardation substance containing a polymerizable liquid crystal in a solution state is applied to perform alignment of the polymerizable liquid crystal. Subsequently, the polymerizable liquid crystal thus aligned is cured to form a patterned retardation material.

As materials having photo-alignment properties that can be used in orientation material formation using a photo-alignment technique for liquid crystal panels, an acrylic resin and a polyimide resin, for example, are known that have in a side chain thereof a photodimerizable moiety such as a cinnamoyl group and a chalcone group, for example. It is disclosed that these resins exhibit a property of controlling alignment of liquid crystals (hereinafter, also called liquid crystal alignment properties) by polarized UV irradiation (see Patent Document 3 to Patent Document 5). Instead of an acrylic resin and a polyimide resin, for example, that have in a side chain thereof a photodimerizable moiety such as a cinnamoyl group and a chalcone group, the use of a low molecular compound having such a photodimerizable moiety is known, which increases alignment sensitivity (Patent Document 6). Patent Document 6 discloses that a polymer produced by using a (meth)acrylamide compound that is substituted with a hydroxymethyl group or an alkoxymethyl group may be used as a cross-linking agent, but discloses no specific embodiment.

PRIOR ART DOCUMENTS

Patent Documents

Patent Document 1: Japanese Patent Application Publication No. 10-232365 (JP 10-232365 A)
Patent Document 2: Japanese Patent Application Publication No. 2005-49865 (JP 2005-49865 A)
Patent Document 3: Japanese Patent No. 3611342 (JP 3611342 B2)
Patent Document 4: Japanese Patent Application Publication No. 2009-058584 (JP 2009-058584 A)
Patent Document 5: Published Japanese Translation of PCT Application No. 2001-517719 (JP 2001-517719 T)
Patent Document 6: WO 2011/126022 pamphlet

SUMMARY OF THE INVENTION

Problem to be Solved by the Invention

However, the study of the inventors of the present invention indicates that acrylic resins having in a side chain thereof a photodimerizable moiety such as a cinnamoyl group and a chalcone group do not provide sufficient properties when the acrylic resins are used for formation of a retardation material. In particular, to irradiate these resins with polarized UV light to form an orientation material and optically pattern a retardation substance including a polymerizable liquid crystal using the orientation material, a large exposure amount of polarized UV light is necessary. This makes the exposure amount of the polarized UV light much larger than the exposure amount (e.g., about 100 $mJ/cm^2$) of polarized UV light sufficient to align a liquid crystal for a general liquid crystal panel.

One of the reasons for the increase in the exposure amount of the polarized UV light is that, in the formation of a retardation material, unlike in a liquid crystal for a liquid crystal panel, a polymerizable liquid crystal in a state of solution is applied onto an orientation material.

When acrylic resins and the like having in a side chain thereof a photodimerizable moiety such as a cinnamoyl group are used to form an orientation material, and a polymerizable liquid crystal is aligned, photocrosslinking due to photodimerization reaction occurs in the acrylic resins and the like. In this process, irradiation with polarized light in a large exposure amount is necessary until the resistance of the orientation material to a polymerizable liquid crystal solution appears. In general, aligning a liquid crystal for a liquid crystal panel requires dimerization reaction only on the surface of an orientation material with photo-alignment properties. When a conventional material such as the acrylic resin is used to provide an orientation material with solvent resistance, the reaction is required to advance into the orientation material; therefore, a larger amount of light exposure is demanded. Consequently, the alignment sensitivity of the conventional material is significantly reduced disadvantageously.

A technique is known in which a cross-linking agent is added to the resin of the conventional material in order to have such solvent resistance. However, it is known that a three-dimensional structure is formed inside a coating that is formed after heat-curing reaction with a cross-linking agent is performed, whereby the photoreactivity is reduced. In other words, the alignment sensitivity is significantly reduced, and even if a conventional material with the cross-linking agent added is used, desired effects cannot be obtained.

In view of the foregoing, a photo-alignment technique that can improve the alignment sensitivity of an orientation material to reduce the exposure amount of polarized UV light and a cured-film formation composition that is used for forming the orientation material are desired. A technique is also desired that can highly efficiently provide a patterned retardation material.

In production of a patterned retardation material for a 3D display using the photo-alignment technique, formation thereof has been conventionally performed on an alkali-free glass substrate. However, in recent years, to meet the demand for production cost reduction, it is desired that such a material be produced on a low-cost substrate such as alkali glass.

However, with a photo-alignment film formed of the conventional material as described above, a liquid crystal cannot be favorably aligned from the influence of the Na content in alkali glass.

The use of a low molecular compound having a photodimerizable moiety can increase the alignment sensitivity. However, in such a system, due to the compatibility between the low molecular compound having a photodimerizable moiety and a liquid crystal, unevenness may occur at the limb of a liquid crystal display element. Thus, desired are an orientation material excellent in alignment sensitivity, pattern formability, transparency, and alignment uniformity, and a cured-film formation composition for forming such an orientation material.

The present invention has been made based on the above-described findings and study results. An object of the present invention is to provide a cured-film formation composition for providing an orientation material that has high photoreaction efficiency and excellent solvent resistance, with which a polymerizable liquid crystal can be aligned even on alkali glass in a highly sensitive manner, and that has excellent alignment uniformity.

Another object of the present invention is to provide an orientation material that is obtained from the cured-film formation composition and has high photoreaction efficiency and excellent solvent resistance, and with which a polymerizable liquid crystal can be aligned even on alkali glass in a highly sensitive manner, and that has excellent alignment uniformity, and to provide a retardation material that is formed with the orientation material.

The other objects and advantages of the present invention will be apparent from the following description.

Means for Solving the Problem

A first aspect of the present invention relates to a cured-film formation composition characterized by comprising:
(A) a compound having a photo-aligning group and one substituent selected from a hydroxy group, a carboxy group, and an amino group;
(B) a hydrophilic polymer having one or more substituents selected from a hydroxy group, a carboxy group, and an amino group; and
(C) a polymer obtained by polymerizing a monomer including an N-hydroxymethyl compound or an N-alkoxymethyl(meth)acrylamide compound.

In the first aspect of the present invention, the photo-aligning group of the component (A) is preferably a functional group having a structure to be photodimerized or photoisomerized.

In the first aspect of the present invention, the photo-aligning group of the component (A) is preferably a cinnamoyl group.

In the first aspect of the present invention, the photo-aligning group of the component (A) is preferably a group of an azobenzene structure.

In the first aspect of the present invention, the component (B) is preferably at least one polymer selected from the group consisting of a polyether polyol, a polyester polyol, a polycarbonate polyol, and a polycaprolactone polyol.

In the first aspect of the present invention, the component (B) is preferably cellulose or a derivative of cellulose.

In the first aspect of the present invention, the component (B) is preferably an acrylic polymer having at least one of a polyethylene glycol ester group and a $C_{2-5}$ hydroxyalkyl ester group and at least one of a carboxy group and a phenolic hydroxy group.

In the first aspect of the present invention, the component (B) is preferably an acrylic copolymer obtained by polymerization reaction of monomers including at least one of a monomer having a polyethylene glycol ester group and a monomer having a $C_{2-5}$ hydroxyalkyl ester group and at least one of a monomer having a carboxy group and a monomer having a phenolic hydroxy group.

In the first aspect of the present invention, the component (B) is preferably an acrylic polymer having in a side chain thereof a hydroxyalkyl group.

In the first aspect of the present invention, the cured-film formation composition preferably further comprises a cross-linking catalyst as a component (D).

In the first aspect of the present invention, a ratio of the component (A) to the component (B) is preferably 5:95 to 60:40 in a mass ratio.

In the first aspect of the present invention, 10 parts by mass to 150 parts by mass of the component (C) is contained based on 100 parts by mass of the total amount of the component (A) and the component (B).

In the first aspect of the present invention, 0.01 part by mass to 10 parts by mass of the component (D) is contained based on 100 parts by mass of the total amount of the compound of the component (A) and the polymer of the component (B).

A second aspect of the present invention relates to an orientation material characterized by being obtained with the cured-film formation composition of the first aspect of the present invention.

A third aspect of the present invention relates to a retardation material characterized by being formed with a cured film that is obtained from the cured-film formation composition of the first aspect of the present invention.

Effects of the Invention

According to the first aspect of the present invention, it is possible to provide a cured-film formation composition for providing an orientation material that is excellent in alignment sensitivity, pattern formability, transparency, and alignment uniformity.

According to the second aspect of the present invention, it is possible to provide an orientation material that is excellent in alignment sensitivity, pattern formability, transparency, and alignment uniformity.

According to the third aspect of the present invention, it is possible to provide a retardation material that can highly efficiently be formed and optically patterned even on alkali glass.

MODES FOR CARRYING OUT THE INVENTION

<Cured-Film Formation Composition>

The cured-film formation composition of the present embodiment contains the low molecular photo-alignment component that is a component (A), the hydrophilic polymer that is a component (B), and the polymer obtained by polymerizing a monomer including an N-hydroxymethyl compound or an N-alkoxymethyl(meth)acrylamide compound that is a component (C). In addition to the component (A), the component (B), and the component (C), the cured-film formation composition of the present embodiment may further contain a cross-linking catalyst as a component (D) and a component for enhancing adhesiveness of the cured film as a component (E). Unless the effects of the present invention are impaired, the cured-film formation composition may contain other additives.

Details of each component will be described below.

<Component (A)>

The component (A) contained in the cured-film formation composition of the present embodiment is the low molecular photo-alignment component described above.

The low molecular photo-alignment component being the component (A) can be a compound having a photo-aligning group and one substituent selected from a hydroxy group, a carboxy group, and an amino group. In the compound having a photo-aligning group and one substituent selected from a hydroxy group, a carboxy group, and an amino group, as described above, the photoreactive group constitutes the hydrophobic photoreactive moiety in the photo-reaction component, and the hydroxy group or the like constitutes the hydrophilic heat-reactive moiety.

In the present invention, the photo-aligning group is a functional group of a structural moiety to be photodimerized or photoisomerized.

The structural moiety to be photodimerized is a moiety that forms a dimer by irradiation with light, and specific examples thereof include a cinnamoyl group, a chalcone group, a coumarin group, and an anthracene group. Among them, a cinnamoyl group having high transparency in the visible light range and photodimerization reactivity is preferred. In addition, the structural moiety to be photoisomerized is a structural moiety that is converted into a cis form or a trans form by irradiation with light, and specific examples thereof include a moiety containing an azobenzene structure and a moiety containing a stilbene structure. Among them, in terms of high reactivity, the azobenzene structure is preferred. The compound having a photo-aligning group and a hydroxy group is, for example, a compound of Formulae:

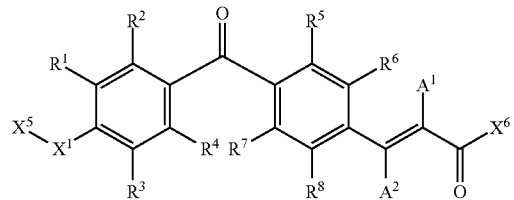
[A1]

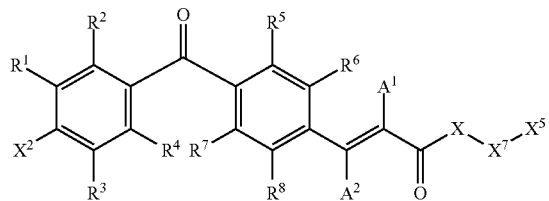
[A2]

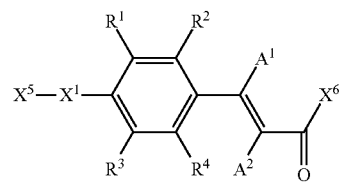
[A3]

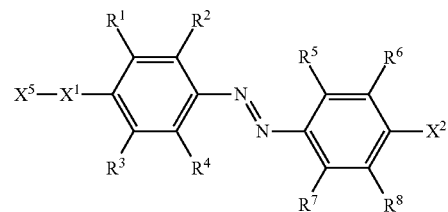
[A4]

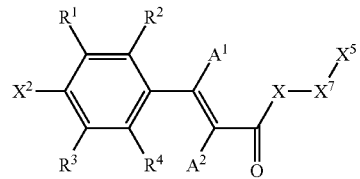
[A5]

In the Formulae, $A^1$ and $A^2$ are each independently a hydrogen atom or a methyl group, and $X^1$ is a structure in which one to three units selected from a $C_{1-18}$ alkylene, a phenylene, and a biphenylene, or a combination of them, are bonded through one or more bonds selected from a single bond, an ether bond, an ester bond, an amide bond, an urethane bond, and an amino bond, or a combination of them. $X^2$ is a hydrogen atom, a halogen atom, a cyano group, a $C_{1-18}$ alkyl group, a phenyl group, a biphenyl group, or a cyclohexyl group. In this case, the $C_{1-18}$ alkyl group, the phenyl group, the biphenyl group, or the cyclohexyl group may be bonded through a covalent bond, an ether bond, an ester bond, an amide bond, or a urea bond. $X^5$ is a hydroxy group, a carboxy group, an amino group, or an alkoxysilyl group. X is a single bond, an oxygen atom, or a sulfur atom. $X^6$ is a hydroxy group, a mercapto group, a $C_{1-10}$ alkoxy group, a $C_{1-10}$ alkylthio group, or a phenyl group. Each of $X^7$ is independently a single bond, a $C_{1-20}$ alkylene group, an aromatic ring group, or an aliphatic ring group. This $C_{1-20}$ alkylene group may be branched or linear.

Among these substituents, the phenylene, the phenyl group, the biphenylene, and the biphenyl group may be substituted with one or more substituents that are selected from a $C_{1-4}$ alkyl group, a $C_{1-4}$ alkoxy group, a halogen atom, a trifluoromethyl group, and a cyano group and are the same as or different from each other.

In the Formulae, $R^1$, $R^2$, $R^3$, $R^4$, $R^5$, $R^6$, $R^7$, and $R^8$ are each independently a hydrogen atom, a $C_{1-4}$ alkyl group, a $C_{1-4}$ alkoxy group, a halogen atom, a trifluoromethyl group, or a cyano group.

Specific examples of the compound having a photo-aligning group and a hydroxy group that is the component (A) include 4-(8-hydroxyoctyloxy)cinnamic acid methyl ester, 4-(6-hydroxyhexyloxy)cinnamic acid methyl ester,
4-(4-hydroxybutyloxy)cinnamic acid methyl ester, 4-(3-hydroxypropyloxy)cinnamic acid methyl ester, 4-(2-hydroxyethyloxy)cinnamic acid methyl ester,
4-hydroxymethyloxycinnamic acid methyl ester, 4-hydroxycinnamic acid methyl ester,
4-(8-hydroxyoctyloxy)cinnamic acid ethyl ester, 4-(6-hydroxyhexyloxy)cinnamic acid ethyl ester, 4-(4-hydroxybutyloxy)cinnamic acid ethyl ester,
4-(3-hydroxypropyloxy)cinnamic acid ethyl ester, 4-(2-hydroxyethyloxy)cinnamic acid ethyl ester, 4-hydroxymethyloxycinnamic acid ethyl ester, 4-hydroxycinnamic acid ethyl ester, 4-(8-hydroxyoctyloxy)cinnamic acid phenyl ester, 4-(6-hydroxyhexyloxy)cinnamic acid phenyl ester, 4-(4-hydroxybutyloxy)cinnamic acid phenyl ester,
4-(3-hydroxypropyloxy)cinnamic acid phenyl ester, 4-(2-hydroxyethyloxy)cinnamic acid phenyl ester, 4-hydroxymethyloxycinnamic acid phenyl ester, 4-hydroxycinnamic acid phenyl ester, 4-(8-hydroxyoctyloxy)cinnamic acid biphenyl ester,
4-(6-hydroxyhexyloxy)cinnamic acid biphenyl ester, 4-(4-hydroxybutyloxy)cinnamic acid biphenyl ester, 4-(3-hydroxypropyloxy)cinnamic acid biphenyl ester,
4-(2-hydroxyethyloxy)cinnamic acid biphenyl ester, 4-hydroxymethyloxycinnamic acid biphenyl ester, 4-hydroxycinnamic acid biphenyl ester, cinnamic acid 8-hydroxyoctyl ester, cinnamic acid 6-hydroxyhexyl ester, cinnamic acid 4-hydroxybutyl ester, cinnamic acid 3-hydroxypropyl ester, cinnamic acid 2-hydroxyethyl ester, cinnamic acid hydroxymethyl ester, 4-(8-hydroxyoctyloxy)azobenzene,
4-(6-hydroxyhexyloxy)azobenzene, 4-(4-hydroxybutyloxy)azobenzene,
4-(3-hydroxypropyloxy)azobenzene, 4-(2-hydroxyethyloxy)azobenzene,
4-hydroxymethyloxyazobenzene, 4-hydroxyazobenzene, 4-(8-hydroxyoctyloxy)chalcone,
4-(6-hydroxyhexyloxy)chalcone, 4-(4-hydroxybutyloxy)chalcone,
4-(3-hydroxypropyloxy)chalcone, 4-(2-hydroxyethyloxy)chalcone,
4-hydroxymethyloxychalcone, 4-hydroxycalcone, 4'-(8-hydroxyoctyloxy)chalcone,
4'-(6-hydroxyhexyloxy)chalcone, 4'-(4-hydroxybutyloxy)chalcone,
4'-(3-hydroxypropyloxy)chalcone, 4'-(2-hydroxyethyloxy)chalcone,
4'-hydroxymethyloxychalcone, 4'-hydroxychalcone, 7-(8-hydroxyoctyloxy)coumarin,
7-(6-hydroxyhexyloxy)coumarin, 7-(4-hydroxybutyloxy)coumarin,
7-(3-hydroxypropyloxy)coumarin, 7-(2-hydroxyethyloxy)coumarin,
7-hydroxymethyloxycoumarin, 7-hydroxycoumarin, 6-hydroxyoctyloxycoumarin,
6-hydroxyhexyloxycoumarin, 6-(4-hydroxybutyloxy)coumarin,
6-(3-hydroxypropyloxy)coumarin, 6-(2-hydroxyethyloxy)coumarin,
6-hydroxymethyloxycoumarin, and 6-hydroxycoumarin.

Specific examples of the compound having a photo-aligning group and a carboxy group include cinnamic acid, ferulic acid, 4-nitrocinnamic acid,
4-methoxycinnamic acid, 3,4-dimethoxycinnamic acid, coumarin-3-carboxylic acid, and
4-(N,N-dimethylamino)cinnamic acid.

Specific examples of the compound having a photo-aligning group and an amino group include methyl-4-aminocinnamic acid, ethyl-4-aminocinnamic acid, methyl-3-aminocinnamic acid, and ethyl-3-aminocinnamic acid.

The low molecular photo-alignment component being the component (A) can be exemplified by the above specific examples, but is not limited to these.

When the photo-alignment component being the component (A) is the compound having a photo-aligning group and a hydroxy group, a compound having in the molecule two or more photo-aligning groups and/or two or more hydroxy groups can be used as the component (A). More specifically, as the component (A), a compound having in the molecule one hydroxy group and two or more photo-aligning groups, a compound having in the molecule one photo-aligning group and two or more hydroxy groups, or a compound having in the molecule two or more photo-aligning groups and two or more hydroxy groups can be used. Examples of the compound having in the molecule two or more photo-aligning groups and two or more hydroxy groups include a compound of Formula:

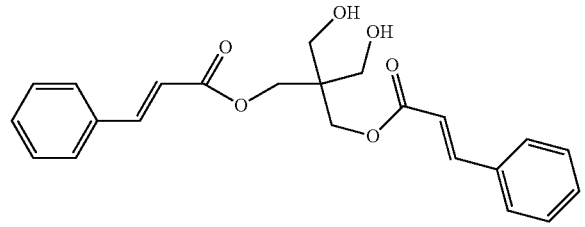 [SMILES: O=C(/C=C/c1ccccc1)OCC(CO)(CO)COC(=O)/C=C/c1ccccc1]

Appropriately selecting such a compound enables control for increasing the molecular weight of the photo-alignment component being the component (A). This can suppress sublimation of the photo-alignment component being the component (A) when the photo-alignment component being the component (A) and the polymer being the component (B) thermally react with the cross-linking agent being the component (C). Thus, the cured-film formation composition of the present embodiment can form an orientation material having high photoreaction efficiency as a cured film.

The compound of the component (A) in the cured-film formation composition of the present embodiment may be a mixture of a plurality types of compounds having a photo-aligning group and one substituent selected from a hydroxy group, a carboxy group, and an amino group.

<Component (B)>

The component (B) contained in the cured-film formation composition of the present embodiment is a hydrophilic polymer.

The polymer being the component (B) can be a polymer (hereinafter, also called a "specific polymer") having one or more substituents selected from a hydroxy group, a carboxy group, and an amino group.

In the cured-film formation composition of the present embodiment, as the specific polymer being the component (B), a highly hydrophilic polymer having high hydrophilicity is preferably selected so as to be more hydrophilic than the component (A). The specific polymer is preferably a polymer having a hydrophilic group such as a hydroxy group, a carboxy group, and an amino group. More specifically, the specific polymer is preferably a polymer having one or more substituents selected from a hydroxy group, a carboxy group, and an amino group.

Examples of the polymer being the component (B) include a polymer having a linear structure or a branched structure such as an acrylic polymer, a polyamic acid, a polyimide, polyvinyl alcohol, a polyester, a polyester polycarboxylic acid, a polyether polyol, a polyester polyol, a polycarbonate polyol, a polycaprolactone polyol, a polyalkylene imine, a polyallylamine, celluloses (cellulose or derivatives thereof), a phenol novolac resin, and a melamine formaldehyde resin, and a cyclic polymer such as cyclodextrins.

Among them, as the acrylic polymer, a polymer obtained by polymerizing a monomer having an unsaturated double bond, such as an acrylic acid ester, a methacrylic acid ester, and styrene can be used.

Examples of the specific polymer being the component (B) preferably include hydroxyalkyl cyclodextrins, celluloses, an acrylic polymer having at least one of a polyethylene glycol ester group and a $C_{2-5}$ hydroxyalkyl ester group and at least one of a carboxy group and a phenolic hydroxy group, an acrylic polymer having an aminoalkyl group in a side chain, an acrylic polymer having a hydroxyalkyl group such as polyhydroxy ethyl methacrylate in a side chain, a polyether polyol, a polyester polyol, a polycarbonate polyol, and a polycaprolactone polyol.

The acrylic polymer that is one preferred example of the specific polymer of the component (B) and that has at least one of a polyethylene glycol ester group and a $C_{2-5}$ hydroxyalkyl ester group and at least one of a carboxy group and a phenolic hydroxy group may be an acrylic polymer having such a structure, and the skeleton of the main chain and the type of the side chain constituting the acrylic polymer are not limited to particular ones.

The structure unit having at least one of a polyethylene glycol ester group and a $C_{2-5}$ hydroxyalkyl ester group is preferably a structure unit of Formula [B1] below.

The structure unit having at least one of a carboxy group and a phenolic hydroxy group is preferably a structure unit of Formula [B2] below.

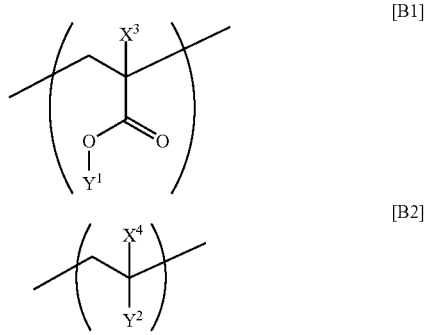

In Formulae [B1] and [B2], $X^3$ and $X^4$ are each independently a hydrogen atom or a methyl group; $Y^1$ is an H—$(OCH_2CH_2)_n$— group (herein, the value of n is 2 to 50, and preferably 2 to 10) or a $C_{2-5}$ hydroxyalkyl group; and $Y^2$ is a carboxy group or a phenolic hydroxy group.

The acrylic polymer being an example of the component (B) has a weight-average molecular weight of preferably 3,000 to 200,000, more preferably 4,000 to 150,000, and still more preferably 5,000 to 100,000. An excessively high weight-average molecular weight exceeding 200,000 may reduce the solubility in solvent, so that the handling property may deteriorate, whereas an excessively low weight-average molecular weight below 3,000 may cause insufficient curing during heat curing, so that the solvent resistance and the heat resistance may decrease. The weight-average molecular weight herein is a value obtained by gel permeation chromatography (GPC) using polystyrene as the standard sample. The same method is used hereinafter in the present specification.

A simple method for synthesizing the acrylic polymer being an example of the component (B) is a method for copolymerizing a monomer (hereinafter, also called a "b1 monomer") having at least one of a polyethylene glycol ester group and a $C_{2-5}$ hydroxyalkyl ester group with a monomer (hereinafter, called a "b2 monomer") having at least one of a carboxy group and a phenolic hydroxy group.

Examples of the monomer having a polyethylene glycol ester group include mono acrylate or mono methacrylate of H—$(OCH_2CH_2)_n$—OH. The value of n is 2 to 50 and preferably 2 to 10.

Examples of the monomer having a $C_{2-5}$ hydroxyalkyl ester group include 2-hydroxyethyl methacrylate, 2-hydroxyethyl acrylate, 2-hydroxypropyl methacrylate, 2-hydroxypropyl acrylate, 4-hydroxybutyl acrylate, and 4-hydroxybutyl methacrylate.

Examples of the monomer having a carboxy group include acrylic acid, methacrylic acid, and vinylbenzoic acid.

Examples of the monomer having a phenolic hydroxy group include p-hydroxystyrene, m-hydroxystyrene, and o-hydroxystyrene.

In the present embodiment, when the acrylic polymer being an example of the component (B) is synthesized, unless the effects of the present invention are impaired, another monomer, specifically a monomer having neither a hydroxy group nor a carboxy group, can be used in addition to the b1 monomer or the b2 monomer.

Examples of this monomer include an acrylic acid ester compound such as methylacrylate, ethylacrylate, propyl acrylate, isopropyl acrylate, butyl methacrylate, butyl acrylate, isobutyl acrylate, and t-butyl acrylate; a methacrylic acid ester compound such as methyl methacrylate, ethyl methacrylate, propyl methacrylate, isopropyl methacrylate, isobutyl methacrylate, and t-butyl methacrylate; a maleimide compound such as maleimide, N-methyl maleimide, N-phenylmaleimide, and N-cyclohexyl maleimide; an acrylamide compound; acrylonitrile; maleic acid anhydride; a styrene compound; and a vinyl compound.

The contents of the b1 monomer and the b2 monomer used for obtaining the acrylic polymer being an example of the component (B) are preferably 2% by mole to 95% by mole and 5% by mole to 98% by mole, respectively, based on the total amount of all monomers used for obtaining the acrylic polymer being the component (B).

When a monomer having only a carboxy group is used as the b2 monomer, it is preferable that the content of the b1 monomer be 60% by mole to 95% by mole and the content of the b2 monomer be 5% by mole to 40% by mole, based on the total amount of all monomers used for obtaining the acrylic polymer being the component (B).

When a monomer having only a phenolic hydroxy group is used as the b2 monomer, it is preferable that the content of the b1 monomer be 2% by mole to 80% by mole and the content of the b2 monomer be 20% by mole to 98% by mole. When the content of the b2 monomer is excessively low, the liquid crystal alignment properties of the composition are prone to be unsatisfactory, and when the content of the b2 monomer is excessively high, the compatibility with the component (A) is prone to decrease.

Although the method for obtaining the acrylic polymer being an example of the component (B) is not limited to a particular method, the acrylic polymer can be obtained, for example, by subjecting the b1 monomer, the b2 monomer, a monomer other than the b1 monomer and the b2 monomer if desired, and a polymerization initiator or the like to polymerization reaction in a solvent in which they coexist at a temperature of 50° C. to 110° C. The solvent used herein is not limited as long as the solvent can dissolve the b1 monomer, the b2 monomer, a monomer other than the b1 monomer and the b2 monomer used if desired, and a polymerization initiator or the like. Specific examples thereof will be described in <Solvent>described later.

Examples of the acrylic polymer having an aminoalkyl group in a side chain, which is one preferred example of the specific polymer of the component (B), include polymers obtained by polymerizing aminoalkyl ester monomers such as aminoethyl acrylate, aminoethyl methacrylate, aminopropyl acrylate, and aminopropyl methacrylate, and polymers obtained by copolymerizing any of the aminoalkyl ester monomers with one or more monomers selected from the group consisting of the b1 monomer, the b2 monomer, and a monomer other than these monomers, for example, a monomer having neither a hydroxy group nor a carboxy group.

Examples of the acrylic polymer having a hydroxyalkyl group in a side chain, which is one preferred example of the specific polymer of the component (B), include a polymer obtained by polymerizing a hydroxyalkyl ester monomer, such as hydroxyethyl acrylate, hydroxyethyl methacrylate, hydroxypropyl acrylate, hydroxypropyl methacrylate, hydroxybutyl acrylate, hydroxybutyl methacrylate, hydroxypentyl acrylate, and hydroxypentyl methacrylate; or a polymer obtained by copolymerizing any of the hydroxyalkyl ester monomers with one or more monomers selected from the group consisting of the b1 monomer, the b2 monomer, and a monomer other than these monomers, for example, a monomer having neither a hydroxy group nor a carboxy group.

The acrylic polymer being an example of the component (B) obtained by the above-described method is generally in a state of being dissolved in the solvent.

A solution of the acrylic polymer being an example of the component (B) obtained by the method is poured into diethyl ether, water, or the like with stirring and the acrylic polymer is reprecipitated. The precipitate thus obtained is filtered and washed, and then is dried at room temperature or dried by heating under atmospheric pressure or reduced pressure. Thus, a powder of the acrylic polymer being an example of the component (B) can be prepared. By this operation, the polymerization initiator and an unreacted monomer that coexist with the acrylic polymer being an example of the component (B) can be removed, and consequently a powder of the purified acrylic polymer being an example of the component (B) can be obtained. If the acrylic polymer cannot be sufficiently purified by one operation, the obtained powder may be redissolved in a solvent, followed by repeating the above-described operation.

Examples of the polyether polyol being one preferred example of the specific polymer of the component (B) include polyethylene glycol, polypropylene glycol, and propylene glycol, and also include those obtained by adding or condensing propylene oxide, polyethylene glycol, polypropylene glycol, or the like, to polyhydric alcohol such as bisphenol A, triethylene glycol, and sorbitol. Specific examples of the polyether polyol include ADEKA polyether P-series, G-series, EDP-series, BPX-series, FC-series, and CM-series manufactured by ADEKA Corporation; and UNIOX (registered trademark) HC-40, HC-60, ST-30E, ST-40E, G-450, and G-750, UNIOL (registered trademark) TG-330, TG-1000, TG-3000, TG-4000, HS-1600D, DA-400, DA-700, and DB-400, and NONION (registered trademark) LT-221, ST-221, and OT-221 manufactured by NOF Corporation.

Examples of the polyester polyol being one preferred example of the specific polymer of the component (B) include those obtained by causing a polyhydric carboxylic acid such as adipic acid, sebacic acid, and isophthalic acid to react with a diol such as ethylene glycol, propylene glycol, butylene glycol, polyethylene glycol, and polypropylene glycol. Specific examples of the polyester polyol include POLYLITE (registered trademark) OD-X-286, OD-X-102, OD-X-355, OD-X-2330, OD-X-240, OD-X-668, OD-X-2108, OD-X-2376, OD-X-2044, OD-X-688, OD-X-2068, OD-X-2547, OD-X-2420, OD-X-2523, OD-X-2555, and OD-X-2560 manufactured by DIC Corporation; and Polyol P-510, P-1010, P-2010, P-3010, P-4010, P-5010, P-6010, F-510, F-1010, F-2010, F-3010, P-1011, P-2011, P-2013, P-2030, N-2010, and PNNA-2016 manufactured by Kuraray Co., Ltd.

Examples of the polycaprolactone polyol being one preferred example of the specific polymer of the component (B) include those obtained by subjecting $\epsilon$-caprolactam to ring-opening polymerization with a polyhydric alcohol such as trimethylolpropane and ethylene glycol as an initiator. Specific examples of the polycaprolactone polyol include POLYLITE (registered trademark) OD-X-2155, OD-X-640, and OD-X-2568 manufactured by DIC Corporation, and PLACCEL (registered trademark) 205, L205AL, 205U, 208, 210, 212, L212AL, 220, 230, 240, 303, 305, 308, 312, and 320 manufactured by Daicel Chemical Industries, Ltd.

Examples of the polycarbonate polyol being one preferred example of the specific polymer of the component (B) include those obtained by causing a polyhydric alcohol such as trimethylolpropane and ethylene glycol to react with diethylcarbonate, diphenylcarbonate, ethylene carbonate, or the like. Specific examples of the polycarbonate polyol include PLACCEL (registered trademark) CD205, CD205PL, CD210, CD220, C-590, C-1050, C-2050, C-2090, and C-3090 manufactured by Daicel Chemical Industries, Ltd.

Examples of the cellulose being one preferred example of the specific polymer of the component (B) include hydroxyalkyl celluloses such as hydroxyethyl cellulose and hydroxypropyl cellulose; and hydroxyalkyl alkyl celluloses such as hydroxyethyl methyl cellulose, hydroxypropyl methyl cellulose, and hydroxyethyl ethyl cellulose. For example, the hydroxyalkyl celluloses such as hydroxyethyl cellulose and hydroxypropyl cellulose are preferred.

Examples of the cyclodextrin being one preferred example of the specific polymer of the component (B) include cyclodextrins such as $\alpha$-cyclodextrin, $\beta$-cyclodextrin, and $\gamma$-cyclodextrin, methylated cyclodextrins such as methyl-$\alpha$-cyclodextrin, methyl-$\beta$-cyclodextrin, and methyl-$\gamma$-cyclodextrin, and hydroxyalkyl cyclodextrins such as hydroxymethyl-$\alpha$-cyclodextrin, hydroxymethyl-$\beta$-cyclodextrin, hydroxymethyl-$\gamma$-cyclodextrin, 2-hydroxyethyl-$\alpha$-cyclodextrin, 2-hydroxyethyl-$\beta$-cyclodextrin, 2-hydroxyethyl-$\gamma$-cyclodextrin, 2-hydroxypropyl-$\alpha$-cyclodextrin, 2-hydroxypropyl-$\beta$-cyclodextrin, 2-hydroxypropyl-$\gamma$-cyclodextrin, 3-hydroxypropyl-$\alpha$-cyclodextrin, 3-hydroxypropyl-$\beta$-cyclodextrin, 3-hydroxypropyl-$\gamma$-cyclodextrin, 2,3-dihydroxypropyl-$\alpha$- cyclodextrin, 2,3-dihydroxypropyl-β-cyclodextrin, and 2,3-dihydroxypropyl-γ-cyclodextrin.

Examples of the melamine formaldehyde resin being one preferred example of the specific polymer of the component (B) include a resin of Formula below obtained by polycondensation of melamine and formaldehyde.

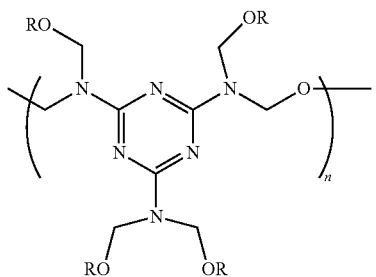

In the Formula, R is a hydrogen atom or a $C_{1-4}$ alkyl group.

In the melamine formaldehyde resin of the component (B), the methylol group produced during the polycondensation of melamine and formaldehyde is preferably alkylated in terms of preservation stability.

Although the method for obtaining the melamine formaldehyde resin of the component (B) is not limited to a particular method, the resin is generally synthesized by mixing melamine and formaldehyde, making the resultant mixture weak alkaline using sodium carbonate, ammonia, or the like, then heating the resultant mixture at 60° C. to 100° C. The methylol group may be alkoxylated by further reaction with an alcohol.

The melamine formaldehyde resin of the component (B) has a weight-average molecular weight of preferably 250 to 5,000, more preferably 300 to 4,000, and still more preferably 350 to 3,500. An excessively high weight-average molecular weight exceeding 5,000 may reduce the solubility in solvent, so that the handling property may deteriorate, whereas an excessively low weight-average molecular weight below 250 may cause insufficient curing during heat curing, so that the solvent resistance and the heat resistance may decrease.

In the present invention, the melamine formaldehyde resin of the component (B) may be used in a form of liquid or in a form of solution in which the purified liquid is redissolved in a solvent described later.

Furthermore, in the present invention, the melamine formaldehyde resin of the component (B) may be a mixture of a plurality of types of the melamine formaldehyde resin of the component (B).

Examples of the phenol novolac resin being one preferred example of the specific polymer of the component (B) include a phenol-formaldehyde polycondensate.

In the cured-film formation composition of the present embodiment, the polymer of the component (B) may be used in a form of powder or in a form of solution in which the purified powder is redissolved in a solvent described later.

Furthermore, in the cured-film formation composition of the present embodiment, the polymer of the component (B) may be a mixture of a plurality of polymer types of the component (B).

<Component (C)>

The component (C) contained in the cured-film formation composition of the present embodiment is a polymer obtained by polymerizing a monomer including an N-hydroxymethyl compound or an N-alkoxymethyl(meth)acrylamide compound.

Examples of the polymer include a polymer obtained by polymerizing a monomer such as N-alkoxymethyl acrylamide or N-hydroxymethyl acrylamide or by copolymerizing the monomer with a copolymerizable monomer. Examples of the polymer include a poly(N-butoxymethylacrylamide), poly(N-ethoxymethylacrylamide), poly(N-methoxymethylacrylamide), poly(N-hydroxymethylacrylamide), a copolymer of N-butoxymethylacrylamide and styrene, a copolymer of N-butoxymethylacrylamide and methyl methacrylate, a copolymer of N-ethoxymethylmethacrylamide and benzyl methacrylate, and a copolymer of N-butoxymethylacrylamide, benzyl methacrylate, and 2-hydroxypropyl methacrylate. The weight-average molecular weight of the polymer is 1,000 to 500,000, preferably 2,000 to 200,000, more preferably 3,000 to 150,000, and still more preferably 3,000 to 50,000.

These polymers of the component (C) may be used singly or in combination of two or more types.

The content of the polymer obtained by polymerizing a monomer including an N-hydroxymethyl compound or an N-alkoxymethyl(meth)acrylamide compound of the component (C) in the cured-film formation composition of the present embodiment is preferably 10 to 150 parts by mass, more preferably 20 to 100 parts by mass, based on 100 parts by mass of the total amount of the compound being the component (A) and the polymer of the component (B). When the content of the polymer obtained by polymerizing a monomer including an N-hydroxymethyl compound or an N-alkoxymethyl(meth)acrylamide compound of the component (C) is excessively low, the solvent resistance and heat resistance of the cured film obtained from the cured-film formation composition decrease, and the sensitivity thereof during photo-alignment decreases. When the content of the polymer is excessively high, the photo-alignment properties and the preservation stability may deteriorate.

<Component (D)>

The cured-film formation composition of the present embodiment can further contain a cross-linking catalyst as a component (D) in addition to the component (A), the component (B), and the component (C).

The cross-linking catalyst being the component (D) can be an acid or a thermal acid generator, for example. This component (D) is effective in promoting heat-curing reaction of the cured-film formation composition of the present embodiment.

The component (D) is not limited as long as the component (D) is a sulfonic acid group-containing compound, hydrochloric acid or a salt thereof, or a compound that thermally decomposes to generate an acid during prebaking or postbaking, that is, a compound that thermally decomposes to generate an acid at a temperature of 80° C. to 250° C. Examples of such a compound include hydrochloric acid; and a sulfonic acid such as methanesulfonic acid, ethanesulfonic acid, propanesulfonic acid, butanesulfonic acid, pentanesulfonic acid, octanesulfonic acid, benzenesulfonic acid, p-toluenesulfonic acid, camphorsulfonic acid, trifluoromethanesulfonic acid, p-phenolsulfonic acid, 2-naphthalenesulfonic acid, mesitylenesulfonic acid, p-xylene-2-sulfonic acid, m-xylene-2-sulfonic acid, 4-ethylbenzenesulfonic acid, 1H,1H,2H,2H-perfluorooctanesulfonic acid, perfluoro(2-ethoxyethane)sulfonic acid, pentafluoroethanesulfonic acid, nonafluorobutane-1-sulfonic acid, and dodecylbenzenesulfonic acid, and a hydrate or a salt thereof. Examples of the compound generating an acid by heat include bis(tosyloxy)ethane, bis(tosyloxy)propane, bis(tosyloxy)butane, p-nitrobenzyl tosylate, o-nitrobenzyl tosylate, 1,2,3-phenylene tris(methylsulfonate), p-toluenesulfonic acid pyridinium salt, p-toluenesulfonic acid morphonium salt, p-toluenesulfonic acid ethyl ester, p-toluenesulfonic acid propyl ester, p-toluenesulfonic acid butyl ester, p-toluenesulfonic acid isobutyl ester, p-toluenesulfonic acid methyl ester, p-toluenesulfonic acid phenethyl ester, cyanomethyl p-toluenesulfonate, 2,2,2-trifluoroethyl p-toluenesulfonate, 2-hydroxybutyl p-toluenesulfonate, N-ethyl-p-toluenesulfonamide, and compounds of Formulae below.

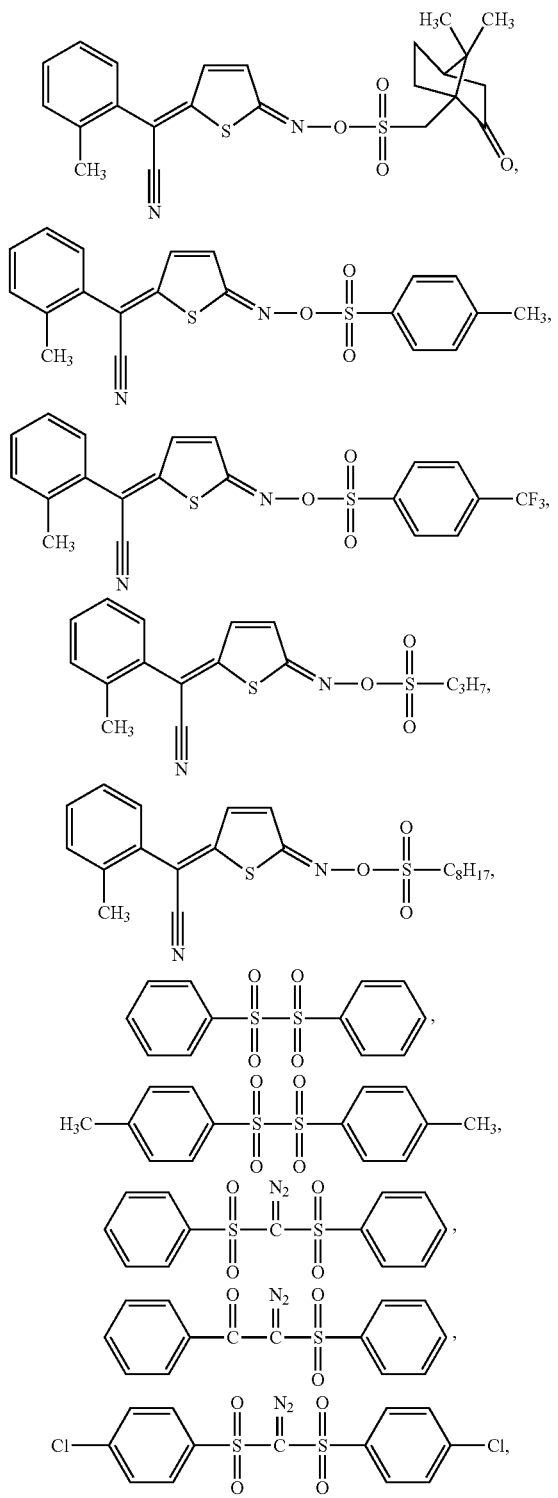

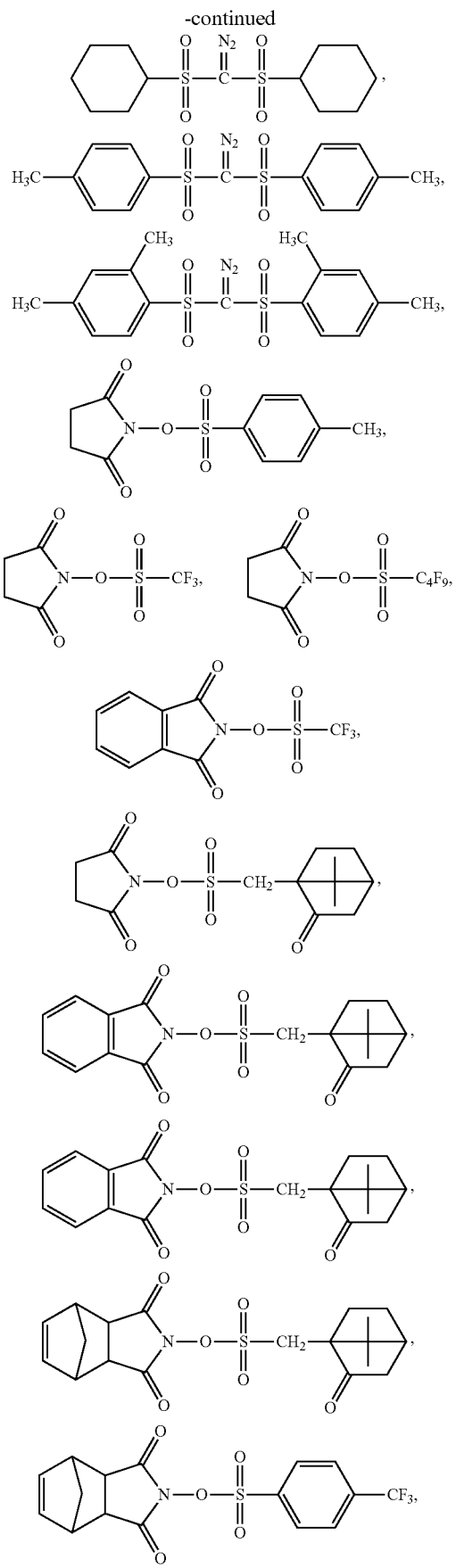

-continued

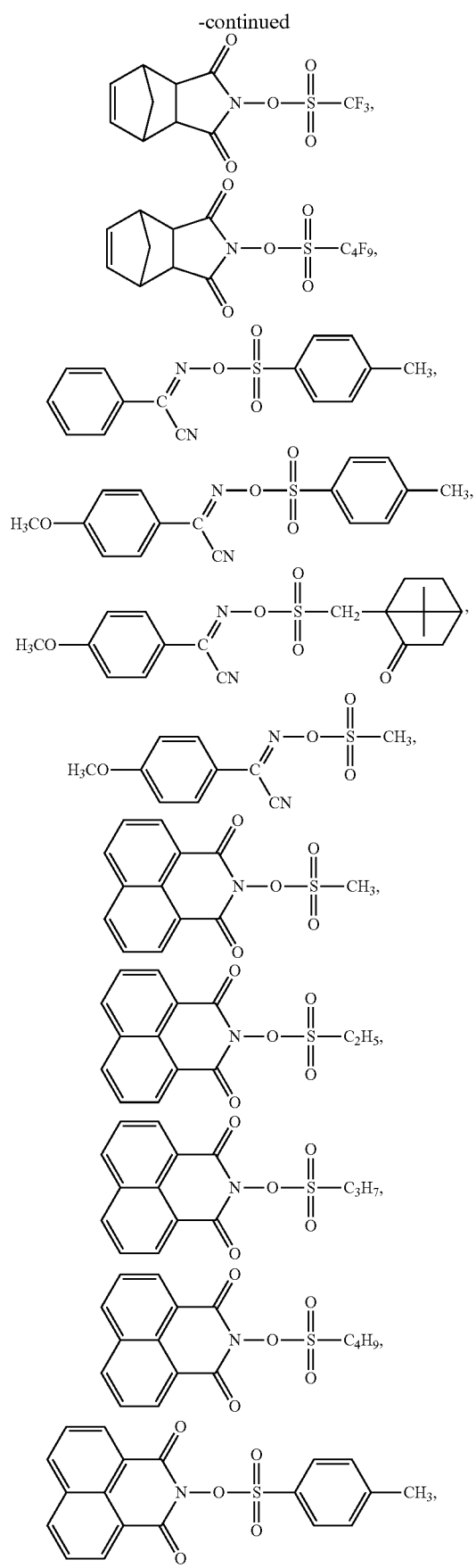

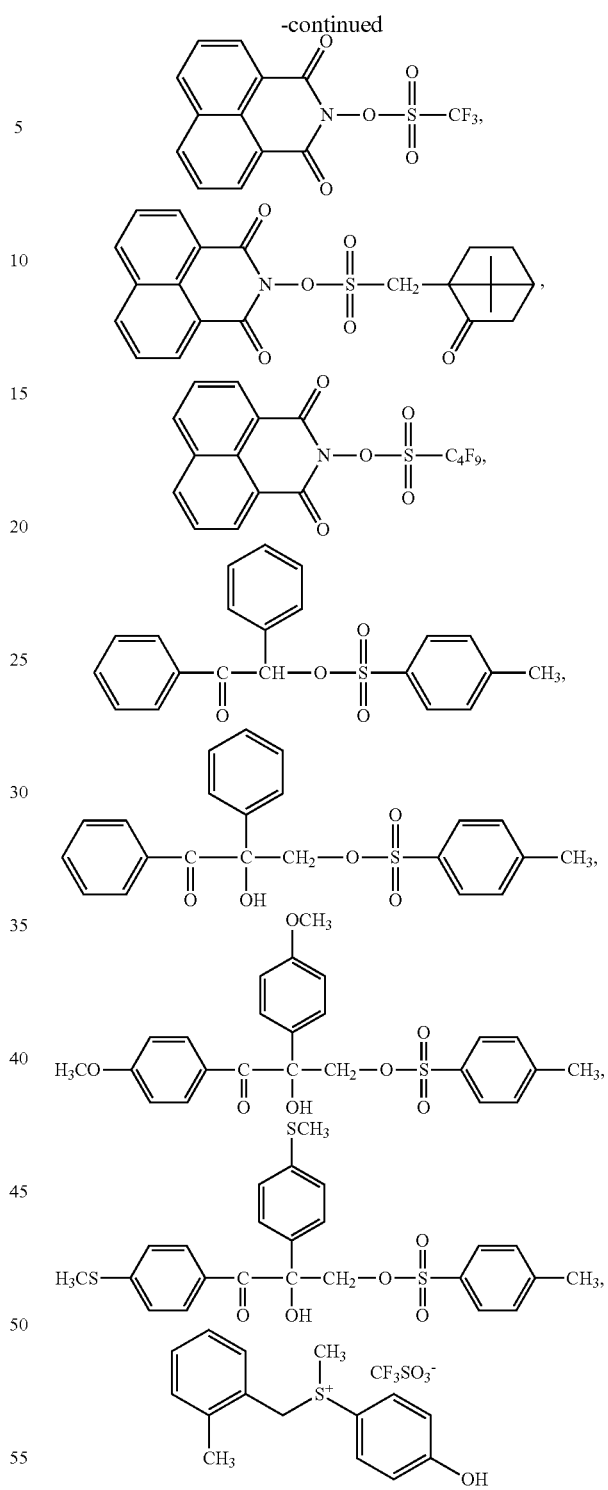

The content of the component (D) in the cured-film formation composition of the present embodiment is preferably 0.01 to 10 parts by mass, more preferably 0.1 to 6 parts by mass, and still more preferably 0.5 to 5 parts by mass with respect to 100 parts by mass of the total amount of the compound of the component (A) and the polymer of the component (B). With the component (D) in a content of 0.01 part by mass or more, satisfactory thermosetting properties and satisfactory solvent resistance can be imparted to the composition, and furthermore, high sensitivity to light irradiation can also be imparted to the composition. However, when the content exceeds 10 parts by mass, the preservation stability of the composition may deteriorate.

<Solvent>

The cured-film formation composition of the present embodiment is mainly used in a solution state in which the composition is dissolved in a solvent. The type, the structure, and the like of the solvent used herein are not limited as long as the solvent can dissolve the component (A), the component (B), and the component (C) and if necessary, the component (D), and/or other additives described below.

Specific examples of the solvent include ethylene glycol monomethyl ether, ethylene glycol monoethyl ether, methylcellosolve acetate, ethylcellosolve acetate, diethylene glycol monomethyl ether, diethylene glycol monoethyl ether, propylene glycol, propylene glycol monomethyl ether, propylene glycol monomethyl ether acetate, propylene glycol propyl ether acetate, toluene, xylene, methyl ethyl ketone, cyclopentanone, cyclohexanone, 2-butanone, 3-methyl-2-pentanone, 2-pentanone, 2-heptanone, γ-butyrolactone, ethyl 2-hydroxypropionate, ethyl 2-hydroxy-2-methylpropionate, ethyl ethoxyacetate, ethyl hydroxyacetate, methyl 2-hydroxy-3-methylbutanoate, methyl 3-methoxypropinoate, ethyl 3-methoxypropionate, ethyl 3-ethoxypropionate, methyl 3-ethoxypropionate, methyl pyruvate, ethyl pyruvate, ethyl acetate, butyl acetate, ethyl lactate, butyl lactate, N,N-dimethylformamide, N,N-dimethylacetamide, and N-methylpyrrolidone.

These solvents may be used singly or in combination of two or more types.

<Other Additives>

Furthermore, the cured-film formation composition of the present embodiment can contain, as long as not impairing the effects of the present invention and if necessary, a sensitizer, a silane coupling agent, a surfactant, a rheology adjusting agent, a pigment, a dye, a preservation stabilizer, an antifoamer, and an antioxidant, for example.

For example, the sensitizer is effective in promoting photoreaction after a heat-cured film is formed with the cured-film formation composition of the present embodiment.

Examples of the sensitizer being one example of other additives include benzophenone, anthracene, anthraquinone, thioxanthone, and derivatives of them; and a nitrophenyl compound. Among them, a benzophenone derivative and a nitrophenyl compound are preferred. Specific examples of the preferred compound include N,N-diethylaminobenzophenone, 2-nitrofluorene, 2-nitrofluorenone, 5-nitroacenaphthene, 4-nitrobiphenyl, 4-nitrocinnamic acid, 4-nitrostilbene, 4-nitrobenzophenone, and 5-nitroindole. In particular, N,N-diethylaminobenzophenone that is a derivative of benzophenone is preferred.

These sensitizers are not limited to those described above. The sensitizer may be used singly or in combination of two or more compounds.

The proportion of the sensitizer used in the cured-film formation composition of the present embodiment is preferably 0.1 to 20 parts by mass, and more preferably 0.2 to 10 parts by mass with respect to 100 parts by mass of the total mass of the specific copolymer of the component (A) and the acrylic polymer of the component (B). When this proportion is excessively low, the effect as a sensitizer may not be sufficiently obtained, and when the proportion is excessively high, decrease of the transmittance and roughening of the coating may occur.

<Preparation of Cured-Film Formation Composition>

The cured-film formation composition of the present embodiment contains the low molecular photo-alignment component that is the component (A), the polymer that is the component (B) and is more hydrophilic than the photo-alignment component of the component (A), and the polymer obtained by polymerizing a monomer including an N-hydroxymethyl compound or an N-alkoxymethyl(meth)acrylamide compound that is a component (C). Unless the effects of the present invention are impaired, the cured-film formation composition may contain other additives.

The blending ratio of the component (A) to the component (B) is preferably 5:95 to 60:40 in a mass ratio. When the content of the component (B) is excessively high, the liquid crystal alignment properties are prone to deteriorate. When the content is excessively low, the solvent resistance is reduced, so that the alignment properties are prone to be degraded.

Preferred examples of the cured-film formation composition of the present embodiment are listed below.

[1]: A cured-film formation composition in which the blending ratio of the component (A) to the component (B) is 5:95 to 60:40 in a mass ratio and that contains the component (C) in a content of 10 to 150 parts by mass based on 100 parts by mass of the total amount of the component (A) and the component (B).

[2]: A cured-film formation composition that contains the component (C) in a content of 10 to 150 parts by mass based on 100 parts by mass of the total amount of the component (A) and the component (B), and a solvent.

[3]: A cured-film formation composition that contains the component (C) in a content of 10 to 150 parts by mass and the component (D) in a content of 0.01 to 10 parts by mass based on 100 parts by mass of the total amount of the component (A) and the component (B), and a solvent.

The blending proportion, a preparation method, and the like when the cured-film formation composition of the present embodiment is used as a solution will be described below in detail.

The proportion of a solid content in the cured-film formation composition of the present embodiment is, but not limited to as long as each component is uniformly dissolved in a solvent, 1% by mass to 80% by mass, preferably 3% by mass to 60% by mass, and more preferably 5% by mass to 40% by mass. The solid content herein indicates components remaining after excluding the solvent from all of the components in the cured-film formation composition.

The preparation method of the cured-film formation composition of the present embodiment is not limited to a particular method. Examples of the preparation method include a method in which the component (A), the component (C), and, if necessary, the component (D) are mixed in a solution of the component (B) dissolved in a solvent, at predetermined proportions, to make the resulting solution uniform, and a method in which in a certain step of this preparation method, other additives are further added therein if necessary, and the resulting solution is mixed.

In the preparation of the cured-film formation composition of the present embodiment, a solution of the specific copolymer obtained by polymerization reaction in the solvent can be used without being processed. In this case, for example, to a solution of the component (B) that is obtained by copolymerizing at least one of a monomer having a polyethylene glycol ester group and a monomer having a $C_{2-5}$ hydroxyalkyl ester group and at least one of a monomer having a carboxy group and a monomer having a phenolic hydroxy group, the component (A), the component (C), and if necessary, the component (D) are added in the same manner described above, and the resulting solution is made uniform. At this time, a solvent may be further added thereto for the purpose of adjusting the concentration. In this case, the solvent used in the process of preparing the component (B) may be the same as or different from the solvent used for adjusting the concentration of the cured-film formation composition.

It is preferable that the solution of the cured-film formation composition thus prepared be used after being filtered with, for example, a filter having a pore diameter of about 0.2 µm.

<Cured Film, Orientation Material, and Retardation Material>

A cured film can be formed as follows: the solution of the cured-film formation composition of the present embodiment is applied onto a substrate (for example, a silicon/silicon dioxide coated substrate, a silicon nitride substrate, a substrate coated with a metal such as aluminum, molybdenum, and chromium, a glass substrate, a quartz substrate, and an ITO substrate) or a film (for example, a resin film such as a triacetylcellulose (TAC) film, a cycloolefin polymer film, a polyethylene terephthalate film, and an acrylic film), and the like, by bar coating, rotation coating, flow coating, roll coating, slit coating, slit coating followed by rotation coating, inkjet coating, printing, or the like, to form a coating; and then the resultant coating is heated and dried, for example, on a hot plate or in an oven.

As a condition for the heating and drying, it is preferable that cross-linking reaction caused by the cross-linking agent proceed in such a manner that a component of an orientation material formed of the cured film is not eluted into a polymerizable liquid crystal solution applied onto the orientation material. For example, a heating temperature and a heating time that are appropriately selected from a temperature range of 60° C. to 200° C. and a time range of 0.4 minute to 60 minutes are used. The heating temperature and the heating time are preferably 70° C. to 160° C. and 0.5 minute to 10 minutes.

The film thickness of the cured film formed with the curable composition of the present embodiment is 0.05 µm to 5 µm, for example, which can be appropriately selected in consideration of level differences and the optical and electrical properties of a substrate used.

When irradiated with polarized UV light, the cured film thus formed can function as an orientation material, that is, a member in which a compound having liquid crystallinity such as liquid crystals is aligned.

As a method for irradiation with polarized UV light, ultraviolet light to visible light having a wavelength of 150 nm to 450 nm are generally used, and the irradiation is performed by radiating linear polarized light in a vertical direction or an oblique direction at room temperature or in a heated state.

Because the orientation material formed of the cured-film composition of the present embodiment has solvent resistance and heat resistance, after a retardation substance including a polymerizable liquid crystal solution is applied onto the orientation material, the retardation substance is heated up to the phase transition temperature of the liquid crystal. Thus, the retardation substance is transformed into a liquid crystal state to be aligned on the orientation material. The retardation substance thus aligned is cured without being processed, whereby the retardation material as a layer having optical anisotropy can be formed.

As the retardation substance, for example, a liquid crystal monomer having a polymerizable group and a composition containing the liquid crystal monomer are used. When the substrate forming the orientation material is a film, the film having the retardation material of the present embodiment is useful as a retardation film. Some of such retardation substances for forming retardation materials are transformed into a liquid crystal state to be aligned on an orientation material in a state of horizontal alignment, cholesteric alignment, vertical alignment, hybrid alignment, or the like, and thus can be used differently depending on the respective retardations required.

When a patterned retardation material used for a 3D display is produced, a cured film that is formed of the cured-film composition of the present embodiment by the above-described method is irradiated with polarized UV light in a direction of +45 degrees, for example, from a predetermined reference through a line-and-space pattern mask, and the cured film is then irradiated with polarized UV light in a direction of −45 degrees after removing the mask. Thus, an orientation material is obtained in which two types of liquid crystal alignment regions are formed and the directions of alignment control of liquid crystals in the regions are different. Subsequently, a retardation substance including a polymerizable liquid crystal solution is applied, and is then heated up to the phase transition temperature of the liquid crystal. Thus, the retardation substance is transformed into a liquid crystal state to be aligned on the orientation material. The retardation substance thus aligned is cured without being processed, whereby a patterned retardation material can be obtained in which two types of retardation regions having different retardation properties are regularly aligned each in plurality.

A liquid crystal display element in which a liquid crystal is aligned can be prepared by sticking together two substrates having orientation materials of the present embodiment with a spacer interposed therebetween so that the orientation materials on the respective substrates face each other, and then injecting a liquid crystal between the substrates.

Thus, the cured-film formation composition of the present embodiment can be suitably used for producing various retardation materials (retardation films) or liquid crystal display elements, for example.

EXAMPLES

The present embodiment will be described in further detail with reference to examples below, but the present embodiment is not limited to the examples.

[Abbreviations Used in Examples]

The following are the meanings of the abbreviations used in Examples below.

<Compound Having Photo-Aligning Group and Hydroxy Group>
CIN1: 4-hydroxyhexyloxy cinnamic acid methyl ester
CIN2: 3-methoxy-4-hydroxyhexyloxy cinnamic acid methyl ester
<Specific Polymer Raw Material>
MAA: methacrylic acid
MMA: methyl methacrylate
HEMA: 2-hydroxyethyl methacrylate
AIBN: α,α'-azobisisobutyronitrile
PCTO: polycaprolactone triol (molecular weight 500)
HPCEL: hydroxypropyl cellulose
PHEM: polyhydroxy ethyl methacrylate (25% by weight PM solution)
PEPO: polyester polyol (adipic acid/diethylene glycol copolymer) (molecular weight 4,800)
PCDO: polycarbonatediol (Mw: 500)
<Cross-Linking Agent>
HMM: hexamethoxymethylmelamine
BMAA: N-butoxymethylacrylamide
<Cross-Linking Catalyst>
PTSA: p-toluenesulfonic acid monohydrate
<Solvent>
PM: propylene glycol monomethyl ether The number-average molecular weight and the weight-average molecular weight of the acrylic copolymer obtained according to Synthesis Examples below were measured with a GPC apparatus manufactured by JASCO Corporation (Shodex (registered trademark) column KF 803L and KF 804L) under the condition of performing elution by flowing an elution solvent tetrahydrofuran in the column (column temperature: 40° C.) at a flow rate of 1 mL/min. The number-average molecular weight (hereinafter, called Mn) and the weight-average molecular weight (hereinafter, called Mw) were expressed as values in terms of polystyrene.

Synthesis Example 1

2.5 g of MAA, 9.2 g of MMA, 5.0 g of HEMA, and 0.2 g of AIBN as a polymerization catalyst were dissolved in 50.7 g of PM, and the resultant solution was caused to react at 70° C. for 20 hours to obtain an acrylic copolymer solution (solid content concentration: 25% by mass) (P1). Mn and Mw of the obtained acrylic copolymer were 19,600 and 45,200, respectively.

Synthesis Example 2

25.0 g of BMAA and 1.04 g of AIBN as a polymerization catalyst were dissolved in 48.4 g of PM, and the resultant solution was caused to react at 85° C. for 20 hours to obtain an acrylic copolymer solution (solid content concentration: 35% by mass) (P2). Mn and Mw of the obtained acrylic copolymer were 4,800 and 3,100, respectively.

Synthesis Example 3

25.0 g of BMAA and 0.52 g of AIBN as a polymerization catalyst were dissolved in 47.4 g of PM, and the resultant solution was caused to react at 70° C. for 20 hours to obtain an acrylic copolymer solution (solid content concentration: 35% by mass) (P3). Mn and Mw of the obtained acrylic copolymer were 10,500 and 17,370, respectively.

Each of the cured-film formation compositions of Examples 1 to 8 and Comparative Examples 1 to 3 was prepared according to the formulation given in Table 1, and the alignment sensitivity, the alignment uniformity, the pattern formability, and the transmittance of each thereof were evaluated.

TABLE 1

| | (A) component (g) | (B) component 1 (g) | (C) component (g) | (D) component (g) | Solvent (g) |
|---|---|---|---|---|---|
| Example 1 | CIN1 1 | P1 4 | P2 2.9 | PTSA 0.1 | PM 43.7 |
| Example 2 | CIN1 1 | HPCEL 1 | P2 2.9 | PTSA 0.1 | PM 46.8 |
| Example 3 | CIN1 1 | PCTO 1 | P2 2.9 | PTSA 0.1 | PM 46.8 |
| Example 4 | CIN1 1 | PHEM 4 | P2 2.9 | PTSA 0.1 | PM 46.8 |
| Example 5 | CIN1 1 | PEPO 1 | P2 2.9 | PTSA 0.1 | PM 46.8 |
| Example 6 | CIN2 1 | P1 4 | P2 2.9 | PTSA 0.1 | PM 43.7 |
| Example 7 | CIN1 1 | PEPO 1 | P3 2.9 | PTSA 0.1 | PM 46.8 |
| Example 8 | CIN1 1 | PCDO 1 | P2 2.9 | PTSA 0.1 | PM 46.8 |
| Comparative Example 1 | CIN1 1 | P1 4 | HMM 1 | PTSA 0.1 | PM 47.2 |
| Comparative Example 2 | CIN1 1 | HPCEL 1 | HMM 1 | PTSA 0.1 | PM 48.6 |
| Comparative Example 3 | CIN1 1 | PEPO 1 | HMM 1 | PTSA 0.1 | PM 48.6 |

[Evaluation of Alignment Sensitivity]

A TAC film was spin coated with each of the cured-film formation compositions of Examples and Comparative Examples by a spin coater at 2,000 rpm for 30 seconds, and then the resultant film was heated and dried at 110° C. for 120 seconds in a heat circulation oven to form a cured film. This cured film was vertically irradiated with linear polarized light of 313 nm to form an orientation material. This orientation material on the substrate was coated with a polymerizable liquid crystal solution RMS03-013C for horizontal alignment manufactured by Merck Ltd., Japan by a spin coater, and then the resultant coating was prebaked on a hot plate at 60° C. for 60 seconds to form a coating having a film thickness of 1.0 µm. This coating on the substrate was exposed at 1,000 mJ/cm$^2$ to fabricate a retardation material. This retardation material on the substrate fabricated was sandwiched between a pair of polarizing plates, and the emergence of retardation properties in the retardation material was observed. The exposure amount of polarized UV light that was necessary for the orientation material to exhibit liquid crystal alignment properties was determined to be the alignment sensitivity.

[Evaluation of Alignment Uniformity]

A TAC film of 10 cm on each side was spin coated with each of the cured-film formation compositions of Examples and Comparative Examples by a spin coater at 2,000 rpm for 30 seconds, and then the resultant film was heated and dried at 110° C. for 120 seconds in a heat circulation oven to form a cured film. This cured film was vertically irradiated with linear polarized light of 313 nm at 20 mJ/cm$^2$ to form an orientation material. The orientation material on the substrate thus irradiated was coated with a polymerizable liquid crystal solution RMS03-013C for horizontal alignment manufactured by Merck Ltd., Japan by a spin coater, and then the resultant coating was prebaked on a hot plate at 60° C. for 60 seconds to form a coating having a film thickness of 1.0 µm. This coating on the substrate was exposed at 1,000 mJ/cm$^2$ to fabricate a retardation material. The retardation material on the substrate fabricated was sandwiched between a pair of polarizing plates. Those having an area from which light did not leak of 90% or more were evaluated as "○" and those having such an area of less than 90% were evaluated as "×".

[Evaluation of Pattern Formability]

A TAC film was spin coated with each of the cured-film formation compositions of Examples and Comparative Examples by a spin coater at 2,000 rpm for 30 seconds, and then the resultant film was heated and dried at 110° C. for 120 seconds in a heat circulation oven to form a cured film. This cured film was vertically irradiated with linear polarized light of 313 nm at 30 mJ/cm$^2$ through a line-and-space pattern mask of 100 µm. After the mask was removed, the substrate was rotated 90 degrees, and was then vertically irradiated with linear polarized light of 313 nm at 15 mJ/cm$^2$. Thus, an orientation material was obtained in which two types of liquid crystal alignment regions were formed and the directions of alignment control of liquid crystals in the regions were different by 90 degrees. This orientation material on the substrate was coated with a polymerizable liquid crystal solution RMS03-013C for horizontal alignment manufactured by Merck Ltd., Japan by a spin coater, and then the resultant coating was prebaked on a hot plate at 60° C. for 60 seconds to form a coating having a film thickness of 1.0 μm. This coating on the substrate was exposed at 1,000 mJ/cm² to fabricate a patterned retardation material. The patterned retardation material produced on the substrate was observed with a polarizing microscope. Those on which a retardation pattern was formed without alignment failure were evaluated as "○", and those on which alignment failure was observed were evaluated as "×".

[Evaluation of Light Transmittance (Transparency)]

A quartz substrate was spin coated with each of the cured-film formation compositions of Examples and Comparative Examples by a spin coater at 2,000 rpm for 30 seconds, and then the resultant film was baked by heating and drying at 110° C. for 120 seconds on a hot plate to form a cured film having a film thickness of 300 nm. The film thickness was measured with F20 manufactured by Filmetrics, Inc. The transmittance of this cured film to light having a wavelength of 400 nm was measured with an ultraviolet-visible spectrophotometer (SHIMAZU UV-2550 manufactured by Shimadzu Corporation).

[Evaluation Results]

Results of the above-described evaluations are given in Table 2 below.

TABLE 2

| | Alignment sensitivity (mJ/cm²) | Alignment uniformity (mJ/cm²) | Pattern formation | Transmittance (%) |
|---|---|---|---|---|
| Example 1 | 10 | ○ | ○ | 100 |
| Example 2 | 10 | ○ | ○ | 100 |
| Example 3 | 10 | ○ | ○ | 100 |
| Example 4 | 10 | ○ | ○ | 100 |
| Example 5 | 10 | ○ | ○ | 100 |
| Example 6 | 20 | ○ | ○ | 100 |
| Example 7 | 10 | ○ | ○ | 100 |
| Example 8 | 10 | ○ | ○ | 100 |
| Comparative Example 1 | 10 | X | ○ | 100 |
| Comparative Example 2 | 10 | X | ○ | 100 |
| Comparative Example 3 | 10 | X | ○ | 100 |

Examples 1 to 8 exhibited liquid crystal alignment properties with a small exposure amount to exhibit high alignment sensitivity, and optical patterning was able to be performed thereon. Furthermore, Examples 1 to 8 exhibited uniform alignment properties in a film surface.

Although Comparative Examples 1 to 3 in which the cross-linking agent other than the component (C) was used exhibited high alignment sensitivity and optical patterning was able to be performed thereon, in-plane alignment uniformity was low.

INDUSTRIAL APPLICABILITY

The cured-film formation composition according to the present invention is very useful as a liquid crystal alignment film for a liquid crystal display element or an orientation material for forming an optically anisotropic film that is provided inside or outside the liquid crystal display element, and is particularly suitable as a material for forming a patterned retardation material for a 3D display. Furthermore, the cured-film formation composition is suitable as a material for forming a cured film such as a protective film, a planarization film, and an insulation film in various displays such as a thin film transistor (TFT) liquid crystal display element and an organic EL element, particularly as a material for forming an interlayer insulation film of a TFT liquid crystal element, a protective film for a color filter, an insulation film of an organic EL element, or the like.

The invention claimed is:

1. A cured-film formation composition comprising:
    (A) a compound having a photo-aligning group and 2 or more hydroxy groups;
    (B) a hydrophilic polymer having one or more substituents selected from a hydroxy group, a carboxy group, and an amino group; and
    (C) a polymer obtained by polymerizing a monomer including an N-hydroxymethyl compound or an N-alkoxymethyl (meth)acrylamide compound.

2. The cured-film formation composition according to claim 1, wherein the photo-aligning group of the component (A) is a functional group having a structure to be photodimerized or photoisomerized.

3. The cured-film formation composition according to claim 1, wherein the photo-aligning group of the component (A) is a cinnamoyl group.

4. The cured-film formation composition according to claim 1, wherein the photo-aligning group of the component (A) is a group of an azobenzene structure.

5. The cured-film formation composition according to claim 1, wherein the component (B) is at least one polymer selected from the group consisting of a polyether polyol, a polyester polyol, a polycarbonate polyol, and a polycaprolactone polyol.

6. The cured-film formation composition according to claim 1, wherein the component (B) is cellulose or a derivative of cellulose.

7. The cured-film formation composition according to claim 1, wherein the component (B) is an acrylic polymer having at least one of a polyethylene glycol ester group and a $C_{2-5}$ hydroxyalkyl ester group and at least one of a carboxy group and a phenolic hydroxy group.

8. The cured-film formation composition according to claim 1, wherein the component (B) is an acrylic polymer having in a side chain a hydroxyalkyl group.

9. The cured-film formation composition according to claim 1, further comprising a cross-linking catalyst as a component (D).

10. The cured-film formation composition according to claim 1, wherein a ratio of the component (A) to the component (B) is 5:95 to 60:40 in a mass ratio.

11. The cured-film formation composition according to claim 1, wherein 10 parts by mass to 150 parts by mass of the component (C) is contained based on 100 parts by mass of the total amount of the component (A) and the component (B).

12. The cured-film formation composition according to claim 8, wherein 0.01 part by mass to 10 parts by mass of the component (D) is contained based on 100 parts by mass of the total amount of the compound of the component (A) and the polymer of the component (B).

13. An orientation material being obtained with the cured-film formation composition as claimed in claim 1.

14. A retardation material being formed with a cured film that is obtained from the cured-film formation composition as claimed in claim 1.

* * * * *